July 19, 1960   O. G. LANDSVERK ET AL   2,945,734
GAS FILLED DOSIMETER AND METHOD OF MANUFACTURING THE SAME
Filed Aug. 12, 1958
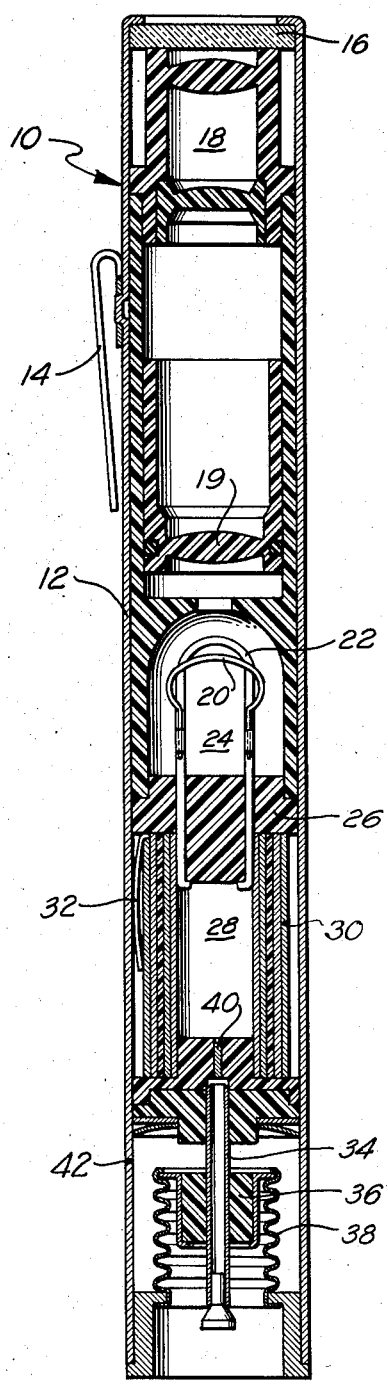
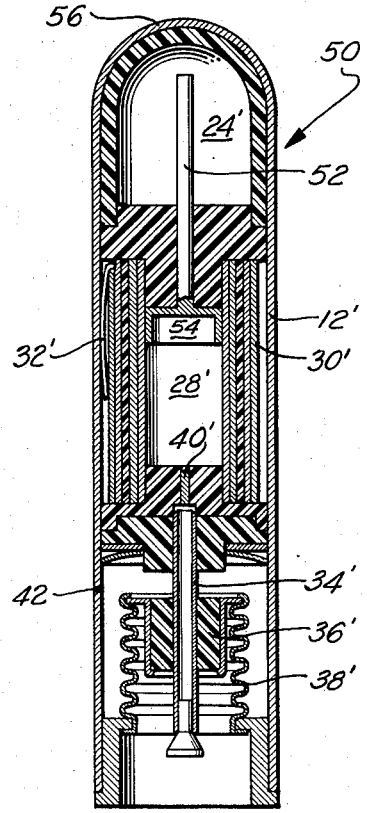
OLE G. LANDSVERK
DELBERT L. MERRINER
INVENTORS
BY
ATTORNEY

United States Patent Office 2,945,734
Patented July 19, 1960

2,945,734

GAS FILLED DOSIMETER AND METHOD OF MANUFACTURING THE SAME

Ole G. Landsverk and Delbert L. Merriner, Glendale, Calif., assignors to Landsverk Electrometer Company, Glendale, Calif., a corporation of California Filed Aug. 12, 1958, Ser. No. 754,599

3 Claims. (Cl. 316—20)

This invention pertains to new and improved gas filled dosimeters and to a method of manufacturing the same.

The term "dosimeters" is commonly used in several different manners. Frequently this term is used only to designate quartz fiber devices for measuring exposure to radioactive radiation. A known type of a quartz fiber dosimeter is shown in the co-pending U.S. patent application, Serial No. 645,059, dated March 11, 1957. The term "dosimeter" is however, capable of broader usage, and may be used to designate devices which are more properly known as pocket chambers and roentgen meters. A difference between these last two types of instruments and quartz fiber dosimeters lies in the fact that the latter two instruments are not direct reading.

Pocket meters and roentgen meters are formed so as to include an electrode projecting into an ionization chamber. Such an ionization chamber is also used in a quartz fiber dosimeter. Within these instruments a quartz fiber voltmeter is mounted within the ionization chamber.

The ionization chambers within both of the types of instruments indicated have conventionally been filled with air. This has been discovered to be disadvantageous because of the effect of air on the performance of these instruments. Air contains oxygen, a rather reactive gas. When an ionization chamber is hermetically sealed so as to contain air the oxygen content of the air will gradually react with materials in contact with it. As a result the sensitivity of these known instruments will gradually decrease at varying rates.

As an example of this common air filled quartz fiber dosimeters will normally decrease in sensitivity at a rate of about 1% per month. The rate of decrease of sensitivity will, of course, vary with temperature. At a temperature of about 150° F. a common quartz fiber dosimeter will decrease about 10% per month in sensitivity. These decreases in sensitivity are, however, limited by the amount of oxygen in the air available to react with various materials within a dosimeter.

The sensitivity of any dosimeter will vary with a number of different factors such as, for example, the internal dimensions of the instrument and the like. Because of these and a number of other factors it is difficult to manufacture dosimeters so that their sensitivities are uniform when they are filled with air at the same pressure. The commercial specifications for dosimeters require that their sensitivities fall within a comparatively narrow range.

In order to correct the variations in the sensitivity of these instruments several different expedients have been adopted. One of these is to control the pressure of the air within a hermetically sealed instrument prior to its being sealed by sealing it in a vacuum or a pressure chamber. Another method has been to put dosimeters having low sensitivity in a refrigerator and to seal them when they are cold, or to put dosimeters having too high a sensitivity in an oven and to seal them while they are at an elevated temperature. It has also been known to transport dosimeters before sealing them to an altitude in which the air pressure is such that the sensitivity of a dosimeter is within a desired range and then to seal them at this altitude. All of these expedients are difficult and expensive from a production point of view.

An object of the present invention is to provide new and improved dosimeters. A more specific object of this invention is to provide dosimeters filled with an inert gas mixture incapable of reacting within these instruments so as to change their sensitivity. Another object of this invention is to provide a new and improved method for manufacturing dosimeters so that they have a predetermined sensitivity. When this method is carried out with inert gases as herein specified the sensitivity of these instruments remains relatively constant throughout their effective life.

Because of the nature of this invention, it is not considered necessary to set forth in this specification a further list of various objects and advantages of the invention itself. Various other objects and advantages of the invention will be fully apparent to those skilled in the art to which the invention pertains from a detailed consideration of the remainder of this description, including the appended claims and the accompanying drawing in which:

Fig. 1 is a cross-sectional view of a quartz fiber dosimeter manufactured in accordance with this invention;

Fig. 2 is a similar view of a pocket chamber dosimeter manufactured in accordance with this invention.

The accompanying drawing is primarily intended so as to clearly indicate two different types of dosimeters with which the present invention may be employed. From the inherent character of the invention as briefly indicated above, those skilled in the art to which this invention pertains will realize that the invention may be used with virtually any type of dosimeter or roentgen meter employing an ionization chamber.

As an aid to understanding this invention it may be stated in essentially summary form that it concerns filling the ionization chamber within a dosimeter with an inert gas which is incapable of reacting with various parts of the dosimeter in contact with this gas. Preferably the inert gas employed is a gas mixture having an effective atomic number which is about the same as the effective atomic number of air so that the sensitivity of the dosimeter may be determined in air and then this air may be replaced with the inert gas, and the instrument sealed. The inert gas mixture employed may, however, have an effective atomic number which differs slightly from the effective atomic number of air so as to change the sensitivity of the dosimeter if this is required.

The actual nature of this invention is best more fully explained by referring directly to the accompanying drawing. In Fig. 1 there is shown a quartz fiber dosimeter of the general type shown in the aforenoted co-pending U.S. patent application, Serial No. 645,059. For convenience only the principal parts of this dosimeter 10 are specifically designated herein. This dosimeter 10 includes an elongated tubular housing 12 having a clip 14 mounted thereon so that it may be carried in the pocket of an individual or the like. A glass plate 16 is sealed to the housing 10 at the upper end of the dosimeter 10, so that an individual using it may look through a microscope assembly 18 and then through a reticule 19 so as to view the position of a quartz fiber 20 carried upon a metal frame 22.

The frame 22 and the fiber 20 are mounted within an ionization chamber 24 which is preferably filled as hereinafter described. The frame 22 is, as indicated, carried upon a non-conductive spacer 26 and is directly connected to a metal tube 28 attached to the inner electrode of a wound condenser 30. The outer electrode of this condenser is electrically connected to the housing 12 through a spring clip 32. A charging pin 34 is mounted upon a non-conductive member 36 carried by a bellows 38 which is sealed with respect to the housing 12. The charging pin 34 is adapted to be moved so as to be in contact with a metal cross member 40 when the complete dosimeter 10 is being charged. The cross-member fits against the tube 28 so as to be in electrical contact with this tube.

From this brief description of the dosimeter 10 it will be seen that the entire instrument is hermetically sealed at its ends, and that within this instrument there are located a number of different parts formed out of a variety of different materials. Many of these parts are formed out of various thermoplastic resinous materials. Because of the nature of the various materials within the housing 12 it is possible for any air within this housing and within the ionization chamber 24 to gradually react so that the oxygen content of the air within the dosimeter 10 is slowly lowered, lowering the sensitivity of the complete dosimeter 10 as previously indicated in the initial part of the specification.

In order to remedy this difficulty in accordance with the broad teachings of this invention, it is possible to fill the ionization chamber 24 and the complete dosimeter 10 with an appropriate inert gas. The term "inert" is not used herein an absolute sense but is intended to designate a gas which is inert with respect to the materials within the dosimeter 10 under the temperature conditions normally encountered. Such inert gases are well known. Various gases of Group I of the Periodic Table, such as helium, argon, neon and the like can be employed, since they are chemically inert under virtually all conditions. Other gases such as nitrogen and the like can be also satisfactorily employed.

The sensitivity of the dosimeter 10 will, of course, vary depending upon the nature of the specific gas or gas mixture located within the ionization chamber 24. For this reason it is preferred with the present invention to utilize within this dosimeter a gas mixture which, as far as the operation of the dosimeter is concerned, behaves the same as air. As a result of the use of such mixtures the dosimeter 10 can be tested and calibrated with air within the instrument in accordance with known practice, and then can be filled with an appropriate inert gas mixture and hermetically sealed.

The operation of the dosimeter 10 is, of course, dependent upon the formation of ions from the gas within the ionization chamber 24. These ions are largely caused by beta rays which emerge from the wall of the ionization chamber and hit this gas. The quantity of ionization carried by a given quantity of electrons is proportional to the total number of electrons that the gas atoms within the ionization chamber contain within their shells. Because of the fact that all gases under the same temperature and pressure conditions have the same number of atoms within a given volume, the number of ions that will be formed within the ionization chamber 24 is in proportion to the atomic number of the gas or gases within the ionization chamber. It will be realized that this latter represents a simplification of a complete discussion of the formation of ions in a dosimeter such as the dosimeter 10, but that it is substantially correct, and that the effective atomic number of any gas mixture can be calculated by considering the relative portions of gases within such a mixture.

The effective atomic number of air is about 7.2. Helium, an inert gas, has an atomic number of 4; thus, when helium is used in the ionization chamber 24 the dosimeter is roughly 55% as sensitive as when air is used. Similarly, the use of nitrogen alone in the ionization chamber 24 lowers the sensitivity of the dosimeter 10 because its atomic number is 7. Argon, having an atomic number of 18, produces more ionization from a given number of beta rays than air within a dosimeter and, hence, increases the sensitivity of an instrument of this type.

It has been found that a mixture of about 7 parts by volume of nitrogen and about 1 part by volume of argon will give approximately the same sensitivity as air when used within a dosimeter such as the dosimeter 10. In carrying out this invention the air within the dosimeter 10 may be evacuated through a small hole 42 in the side wall, and then the instrument may be filled with a gas mixture of this type, and after this gas mixture has reached atmospheric pressure the hole may be sealed in accordance with known teachings, as by the use of solder. Various other similar known techniques for placing a desired gas mixture within the interior of the dosimeter 10 may also be employed. These techniques will obviously have to vary somewhat depending upon the precise construction of any specific instrument.

With the preferred method of using this invention before the operations indicated in the preceding paragraph are carried out a dosimeter such as the dosimeter 10 is tested in air of atmospheric pressure in order to determine its sensitivity and then this instrument is filled with an inert gas mixture using the procedure indicated. The gas mixture used in filling the instrument is, however, may be varied depending upon the sensitivity of this instrument itself. If, because of various manufacturing techniques or problems the instrument is about 6% too insensitive it may be filled with a mixture of about 6 parts by volume of nitrogen and about 2 parts by volume of argon instead of the mixture indicated above. On the other hand if the instrument is too sensitive by an amount of 6%, the sensitivity of this instrument may be decreased by filling it with a mixture of pure nitrogen.

A number of other similar mixtures using such gases as helium, xenon or the like can be readily created using known techniques so as to provide a gas mixture having an effective atomic number which is sufficient to either maintain the sensitivity of a dosimeter or to alter its sensitivity as may be required.

The broad features of this invention can be applied to a number of other instruments besides dosimeters. In Fig. 2 of the drawing there is shown a pocket chamber dosimeter or roentgen meter 50 which is constructed so as to be similar to the dosimeter 10. For convenience those parts of the meter 50 which are identical or substantially identical with the dosimeter 10 are designated by the primes of the numerals previously used.

In the instrument 50 the frame 22 and the quartz fiber 24 are replaced by a collecting electrode 52 which extends into an ionization chamber 24'. The end 54 of this collecting electrode 52 is formed so as to have a cup-like shape, and fits against a tube 28' so as to be in electrical contact therewith. The housing 12' above the chamber 24' is provided with a closed end 56 in the pocket chamber dosimeter 50. This chamber 24', and, in fact, the entire instrument 50 is preferably fitted with an inert gas mixture as indicated in the preceding discussion.

The procedure described in this specification can be employed with a large number of other instruments for measuring exposure to radioactive radiation besides the specific devices 10 and 50 herein described. For this reason this invention is to be considered as being limited only by the appended claims.

We claim:

1. A method of manufacturing a dosimeter containing an ionization chamber so that said dosimeter has a predetermined sensitivity to radioactive radiation, said method comprising: measuring the sensitivity of said dosimeter with air at atmospheric pressure in said ionization chamber; replacing the air in said chamber by a gas mixture having an effective atomic number sufficient to cause the sensitivity of said dosimeter to have a desired value; and sealing said gas mixture within said ionization chamber.

2. A method of manufacturing a dosimeter containing an ionization chamber so that said dosimeter has a predetermined sensitivity to radioactive radiation, said method comprising: measuring the sensitivity of said dosimeter with air at atmospheric pressure in said ionization chamber; replacing the air in said chamber by a gas mixture which is inert with respect to all parts of said dosimeter in contact with said gas mixture and which has an effective atomic number sufficient to cause the sensitivity of said dosimeter to have a desired value; and sealing said gas mixture within said ionization chamber.

3. A method of manufacturing a dosimeter containing an ionization chamber so that said dosimeter has a predetermined sensitivity to radioactive radiation, said method comprising: measuring the sensitivity of said dosimeter with air at atmospheric pressure in said ionization chamber; replacing the air in said chamber by a mixture of nitrogen and argon which is inert with respect to all parts of said dosimeter in contact with said mixture of nitrogen and argon and which has an effective atomic number sufficient to cause the sensitivity of said dosimeter to have a desired value; and sealing said gas mixture within said ionization chamber.

References Cited in the file of this patent

UNITED STATES PATENTS

| | | |
|---|---|---|
| 2,215,441 | Ruse | Sept. 17, 1940 |
| 2,574,820 | Feuer | Nov. 13, 1951 |
| 2,701,175 | Mazzagatti | Feb. 1, 1955 |
| 2,731,568 | Failla | Jan. 17, 1956 |
| 2,805,345 | Warmoltz et al. | Sept. 3, 1957 |